US012656774B2

(12) United States Patent
Fischer et al.

(10) Patent No.: US 12,656,774 B2
(45) Date of Patent: Jun. 16, 2026

(54) SAFEGUARDED TELE-OPERATION FOR AUTONOMOUS DRIVING

(71) Applicant: Nissan North America, Inc., Franklin, TN (US)

(72) Inventors: Mark Fischer, Santa Rosa, CA (US); Viju James, Fremont, CA (US); Christopher Ostafew, Mountain View, CA (US); Julie D. Wright, San Jose, CA (US); Liam Pedersen, San Francisco, CA (US)

(73) Assignee: Nissan North America, Inc., Franklin, TN (US)

( * ) Notice: Subject to any disclaimer, the term of this patent is extended or adjusted under 35 U.S.C. 154(b) by 200 days.

(21) Appl. No.: 18/240,427

(22) Filed: Aug. 31, 2023

(65) Prior Publication Data

US 2025/0076874 A1     Mar. 6, 2025

(51) Int. Cl.
*G05D 1/00*         (2006.01)
*B60W 60/00*      (2020.01)

(52) U.S. Cl.
CPC ......... *G05D 1/0044* (2013.01); *B60W 60/001* (2020.02); *G05D 1/0038* (2013.01); *B60W 2556/45* (2020.02)

(58) Field of Classification Search
CPC . G05D 1/0044; G05D 1/0038; B60W 60/001; B60W 2556/45
See application file for complete search history.

(56) References Cited

U.S. PATENT DOCUMENTS

| | | | |
|---|---|---|---|
| 2019/0302761 A1 | 10/2019 | Huang et al. | |
| 2020/0276984 A1* | 9/2020 | Matsumoto | ........ B60W 60/0011 |
| 2021/0349459 A1* | 11/2021 | Huang | .................... G06F 3/011 |

* cited by examiner

*Primary Examiner* — Vivek D Koppikar
*Assistant Examiner* — Jeffrey R Chalhoub
(74) *Attorney, Agent, or Firm* — Young Basile Hanlon & MacFarlane, P.C.

(57)                ABSTRACT
A system may receive a video stream from a camera of a vehicle in a transportation network. The system may also receive an input indicating an acceleration and a steering angle of a simulated lead vehicle. The system may determine a pose of the simulated vehicle relative to a home pose based on the acceleration input and the steering input, and display an overlay of a representation of the simulated vehicle in the video stream at pixel coordinates based on the pose. The system may determine, from the pixel coordinates, spatial coordinates of the simulated vehicle in the transportation network, wherein the spatial coordinates are relative to at least one of the transportation network or the camera. The system may transmit the spatial coordinates to the vehicle to cause the vehicle to follow a path based on the spatial coordinates.

21 Claims, 10 Drawing Sheets

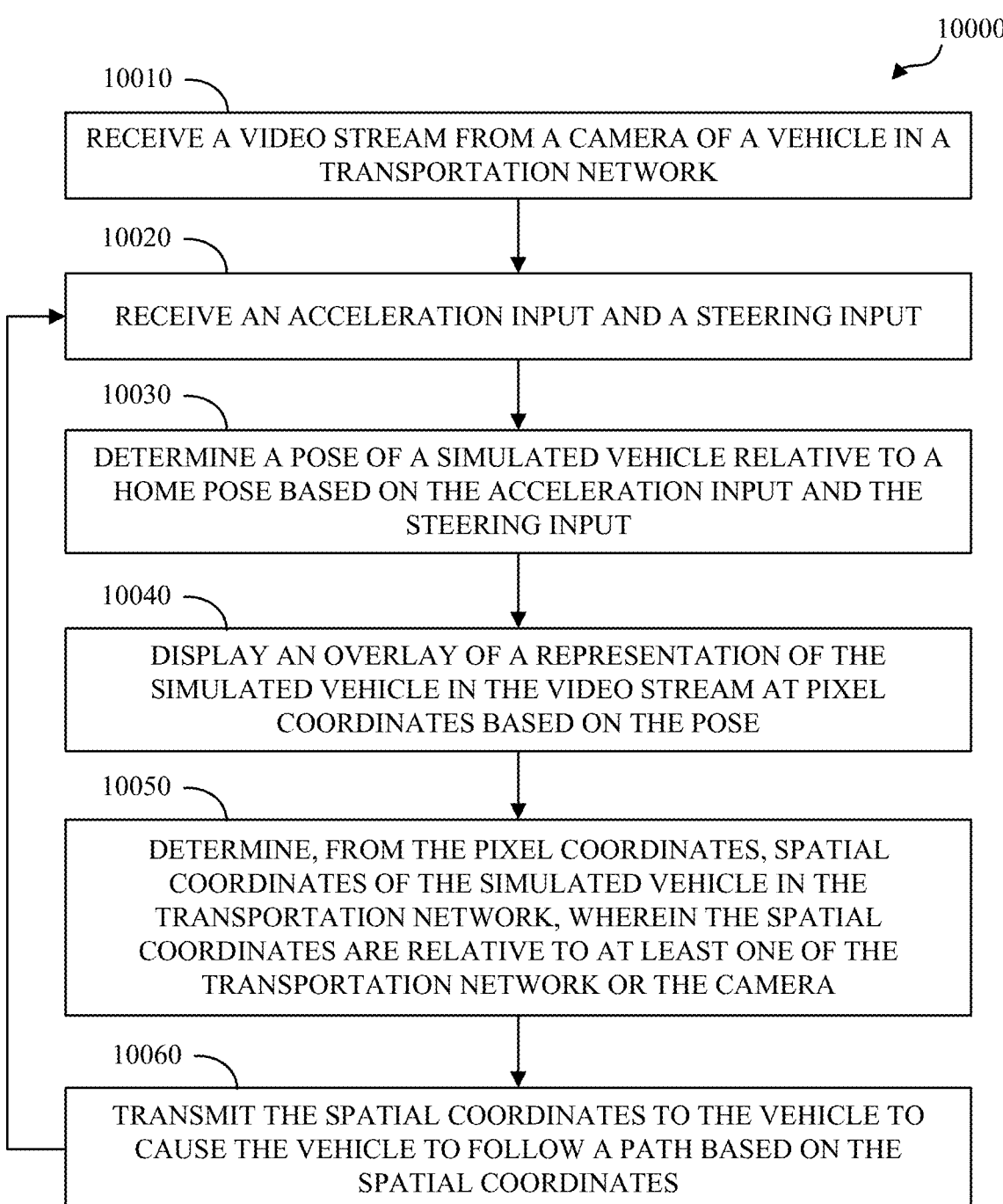

10000

10010

RECEIVE A VIDEO STREAM FROM A CAMERA OF A VEHICLE IN A TRANSPORTATION NETWORK

10020

RECEIVE AN ACCELERATION INPUT AND A STEERING INPUT

10030

DETERMINE A POSE OF A SIMULATED VEHICLE RELATIVE TO A HOME POSE BASED ON THE ACCELERATION INPUT AND THE STEERING INPUT

10040

DISPLAY AN OVERLAY OF A REPRESENTATION OF THE SIMULATED VEHICLE IN THE VIDEO STREAM AT PIXEL COORDINATES BASED ON THE POSE

10050

DETERMINE, FROM THE PIXEL COORDINATES, SPATIAL COORDINATES OF THE SIMULATED VEHICLE IN THE TRANSPORTATION NETWORK, WHEREIN THE SPATIAL COORDINATES ARE RELATIVE TO AT LEAST ONE OF THE TRANSPORTATION NETWORK OR THE CAMERA

10060

TRANSMIT THE SPATIAL COORDINATES TO THE VEHICLE TO CAUSE THE VEHICLE TO FOLLOW A PATH BASED ON THE SPATIAL COORDINATES

FIG. 10

SAFEGUARDED TELE-OPERATION FOR AUTONOMOUS DRIVING

TECHNICAL FIELD

This disclosure relates generally to autonomous vehicles, and more particularly to transmitting information to cause a vehicle to follow a projected path.

BACKGROUND

Autonomous vehicles (AVs) offer human drivers the convenience of efficient conveyance from one location to another without having to direct their attention to the state of the road. An AV can be described as a self-driven (e.g., computer controlled) vehicle that is capable of driving on roadways while obeying traffic rules and norms. However, even the best autonomous-vehicle programming cannot account for or appropriately respond to all conditions and situations that may arise during operation of the autonomous vehicle. Further, there may be times when the autonomous vehicle encounters conditions and situations that might benefit from the assistance of a human operator (e.g., a tele-operator).

SUMMARY

Disclosed herein are aspects, features, elements, implementations, and embodiments of transmitting information to cause a vehicle to follow a projected path.

An aspect of the disclosed embodiments is a method that includes receiving a video stream from a camera of a vehicle in a transportation network; receiving an acceleration input and a steering input; determining a pose of a simulated vehicle relative to a home pose based on the acceleration input and the steering input; displaying an overlay of a representation of the simulated vehicle in the video stream at pixel coordinates based on the pose; determining, from the pixel coordinates, spatial coordinates of the simulated vehicle in the transportation network, wherein the spatial coordinates are relative to at least one of the transportation network or the camera; and transmitting the spatial coordinates to the vehicle to cause the vehicle to follow a path based on the spatial coordinates.

Another aspect of the disclosed embodiments is an apparatus that includes a memory and a processor configured to execute instructions stored in the memory to receive a video stream from a camera of a vehicle in a transportation network; to receive an acceleration input and a steering input; to determine a pose of a simulated vehicle relative to a home pose based on the acceleration input and the steering input; to display an overlay of a representation of the simulated vehicle in the video stream at pixel coordinates based on the pose; to determine, from the pixel coordinates, spatial coordinates of the simulated vehicle in the transportation network, wherein the spatial coordinates are relative to at least one of the transportation network or the camera; and to transmit the spatial coordinates to the vehicle to cause the vehicle to follow a path based on the spatial coordinates.

Another aspect of the disclosed embodiments is a non-transitory computer-readable medium that stores instructions operable to cause one or more processors to perform operations that include: receiving a video stream from a camera of a vehicle in a transportation network; receiving an acceleration input and a steering input; determining a pose of a simulated vehicle relative to a home pose based on the acceleration input and the steering input; displaying an overlay of a representation of the simulated vehicle in the video stream at pixel coordinates based on the pose; determining, from the pixel coordinates, spatial coordinates of the simulated vehicle in the transportation network, wherein the spatial coordinates are relative to at least one of the transportation network or the camera; and transmitting the spatial coordinates to the vehicle to cause the vehicle to follow a path based on the spatial coordinates.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The various aspects of the methods and apparatuses disclosed herein will become more apparent by referring to the examples provided in the following description and drawings in which like reference numbers refer to like elements unless otherwise noted.

FIG. 10 is a flowchart of an example of a process for displaying an overlay including a simulated lead vehicle and a projected path thereof.

DETAILED DESCRIPTION

Figure 1:
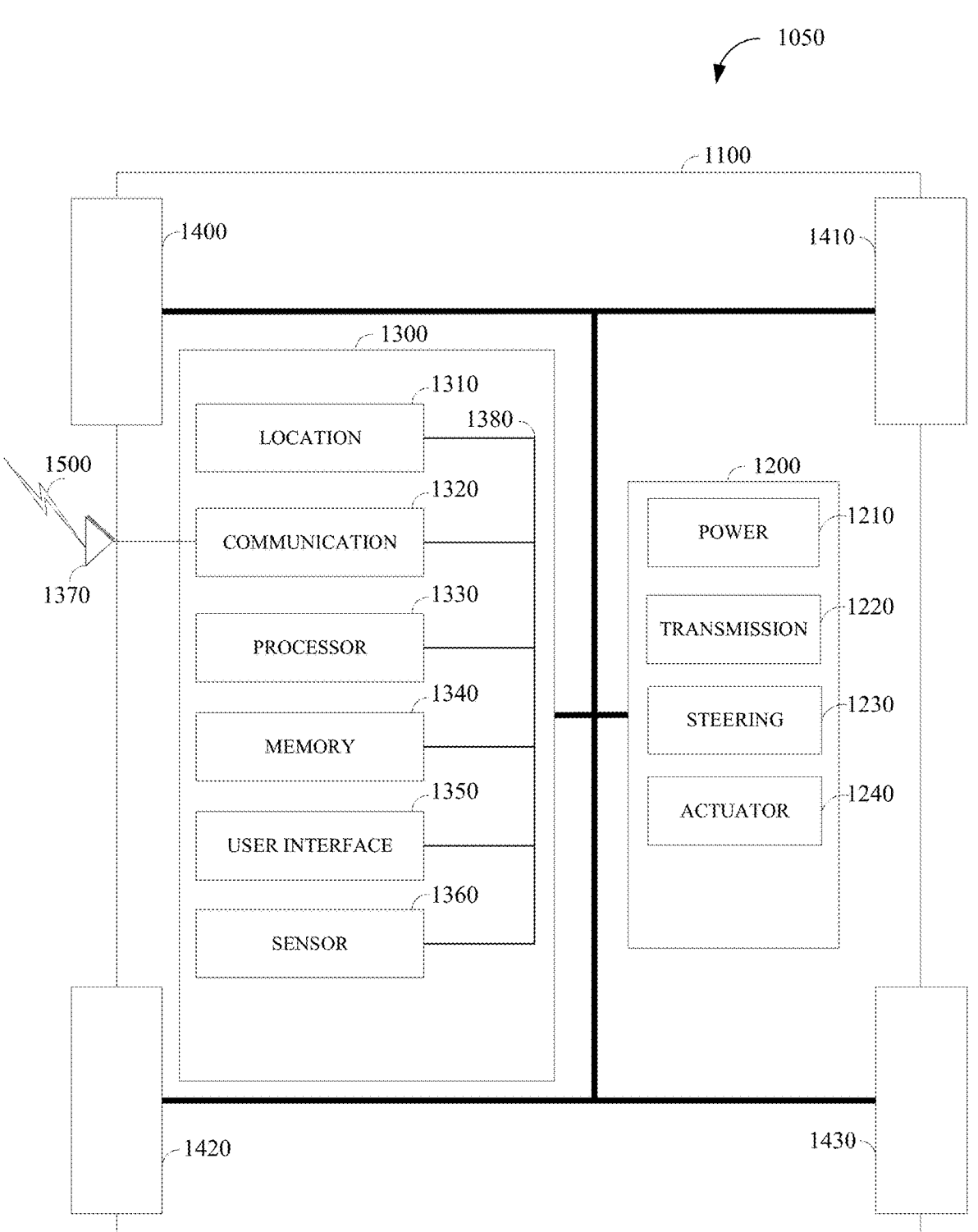
FIG. 1 is a diagram of an example of a portion of a vehicle in which the aspects, features, and elements disclosed herein may be implemented.

Tele-operation enables an autonomous vehicle (AV) to ensure safety during a trip, such as in situations where an artificial intelligence (AI) system of the AV is unable to determine an optimum course of action. For example, an AV may not be able to fully assess, classify, and/or understand the intentions of other road users. The other road users can include pedestrians, construction workers, policemen, construction equipment, vehicles, cyclists, or other static objects (e.g., buildings, road signs, etc.). For example, assessing the road situation may be outside the sensing capabilities of the AV, such as in the case of identifying whether other road users are present around a corner that is obstructed by a building or whether other road users are present on the other side of a hill. Furthermore, resolving some situations (e.g., obstruction situations) may require the AV to deviate from the normal (e.g., legal, socially acceptable) rules of driving in a manner that is unacceptable without human oversight.

Tele-operation may be enabled by allowing a tele-operator to remotely navigate a vehicle by utilizing a video stream of the environment in front and around the vehicle. However, in some cases, it may be time consuming for the tele-operator to generate a path for the vehicle. For example, the tele-operator may need to determine multiple waypoints on a map to establish the path, then transmit the path to the vehicle. Depending on the complexity of the situation, the time involved to create the path may cause an unreasonable delay for the vehicle to make progress. As a result, unless, the video stream has a low latency, the tele-operation may be ineffective. Further, since the tele-operator is not physically located inside the vehicle, it may be difficult for the tele-operator to visualize the driving situation.

Implementations of this disclosure address problems such as these by displaying an overlay in a video stream in graphical user interface (GUI) to improve tele-operation of a vehicle. In some implementations, a system can receive a video stream from one or more cameras of a vehicle in a transportation network. The system can also receive an acceleration input and a steering input for a simulated lead vehicle, i.e., a simulated vehicle that will advance (virtually) ahead of the vehicle in the transportation network. The system can determine a pose of the simulated vehicle relative to a home pose based on the acceleration input and the steering input. The system can display an overlay of a representation of the simulated vehicle in the video stream at pixel coordinates based on the pose. The system can determine, from the pixel coordinates, spatial coordinates of the simulated vehicle in the transportation network, wherein the spatial coordinates are relative to at least one of the transportation network or the camera. The system can transmit the spatial coordinates to the vehicle to cause the vehicle to follow a path based on the spatial coordinates. In some implementations, the system can generate the overlay to assist a tele-operator. In some implementations, the home pose corresponds to a pose of the vehicle relative to at least one of the transportation network or the camera. In some implementations, the system may receive a reset input to reset the pose of the simulated vehicle to the home pose.

The overlay of the simulated vehicle may be drawn in the video stream received from the front camera of the car. In some implementations, the representation of the simulated vehicle comprises representations of a set of wheels, a chassis, a front bumper, and a read bumper, each modeled after the vehicle. In some implementations, the representation of the simulated vehicle is displayed in the video stream after the acceleration input exceeds a predetermined threshold.

In some implementations, the system may determine a projected path of the simulated vehicle based on the pose of the simulated vehicle and at least one of the acceleration input and the steering input. The system may display an overlay of a representation of the projected path in the video stream. The overlay of the projected path of the simulated vehicle may be drawn in the video stream received from the front camera of the car. In some implementations, the overlay may enable the tele-operator to visualize a path that the simulated vehicle will travel given the previous and/or current acceleration input and steering input, so that action can be taken, for example, to avoid an obstruction along the path.

In some implementations, the system may determine a speed of the simulated vehicle; and the system may transmit information to the vehicle representing at least one of: the steering input, the acceleration input, the speed, and a yaw component of the pose of the simulated vehicle.

To describe some implementations in greater detail, reference is made to the following figures.

FIG. 1 is a diagram of an example of a vehicle 1050 in which the aspects, features, and elements disclosed herein may be implemented. The vehicle 1050 may include a chassis 1100, a powertrain 1200, a controller 1300, wheels 1400/1410/1420/1430, or any other element or combination of elements of a vehicle. Although the vehicle 1050 is shown as including four wheels 1400/1410/1420/1430 for simplicity, any other propulsion device or devices, such as a propeller or tread, may be used. In FIG. 1, the lines interconnecting elements, such as the powertrain 1200, the controller 1300, and the wheels 1400/1410/1420/1430, indicate that information, such as data or control signals, power, such as electrical power or torque, or both information and power, may be communicated between the respective elements. For example, the controller 1300 may receive power from the powertrain 1200 and communicate with the powertrain 1200, the wheels 1400/1410/1420/1430, or both, to control the vehicle 1050, which can include accelerating, decelerating, steering, or otherwise controlling the vehicle 1050.

The powertrain 1200 includes a power source 1210, a transmission 1220, a steering unit 1230, a vehicle actuator 1240, or any other element or combination of elements of a powertrain, such as a suspension, a drive shaft, axles, or an exhaust system. Although shown separately, the wheels (wheel 1400, wheel 1410, wheel 1420, and wheel 1430) may be included in the powertrain 1200.

The power source 1210 may be any device or combination of devices operative to provide energy, such as electrical energy, chemical energy, or thermal energy. For example, the power source 1210 includes an engine, such as an internal combustion engine, an electric motor, or a combination of an internal combustion engine and an electric motor, and is operative to provide energy as a motive force to one or more of the wheels (wheel 1400, wheel 1410, wheel 1420, and wheel 1430). In some embodiments, the power source 1210 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 receives energy from the power source 1210 and transmits the energy to the wheels (wheel 1400, wheel 1410, wheel 1420, and wheel 1430) to provide a motive force. The transmission 1220 may be controlled by the controller 1300, the vehicle actuator 1240 or both. The steering unit 1230 may be controlled by the controller 1300, the vehicle actuator 1240, or both and controls the wheels (wheel 1400, wheel 1410, wheel 1420, and wheel 1430) to steer the vehicle. The vehicle actuator 1240 may receive signals from the controller 1300 and may actuate or control the power source 1210, the transmission 1220, the steering unit 1230, or any combination thereof to operate the vehicle 1050.

In some embodiments, the controller 1300 includes a location unit 1310, an electronic communication unit 1320, a processor 1330, a memory 1340, a user interface 1350, a sensor 1360, an electronic communication interface 1370, or any combination thereof. Although shown as a single unit, any one or more elements of the controller 1300 may be integrated into any number of separate physical units. For example, the user interface 1350 and processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof can be integrated in one or more electronic units, circuits, or chips.

In some embodiments, the processor 1330 includes any device or combination of devices capable of manipulating or processing a signal or other information now existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more an application-specific integrated circuits (ASICs), one or more field-programmable gate arrays (FPGAs), one or more programmable logic arrays (PLAs), one or more programmable logic controllers (PLCs), one or more state machines, or any combination thereof. The processor 1330 may be operatively coupled with the location unit 1310, the memory 1340, the electronic communication interface 1370, the electronic communication unit 1320, the user interface 1350, the sensor 1360, the powertrain 1200, or any combination thereof. For example, the processor may be operatively coupled with the memory 1340 via a communication bus 1380.

In some embodiments, the processor 1330 may be configured to execute instructions including instructions for remote operation which may be used to operate the vehicle 1050 from a remote location including an operations center. The instructions for remote operation may be stored in the vehicle 1050 or received from an external source such as a traffic management center, or server computing devices, which may include cloud-based server computing devices. The processor 1330 may be configured to execute instructions for following a projected path as described herein.

The memory 1340 may include any tangible non-transitory computer-usable or computer-readable medium, capable of, for example, containing, storing, communicating, or transporting machine readable instructions or any information associated therewith, for use by or in connection with the processor 1330. The memory 1340 is, for example, one or more solid state drives, one or more memory cards, one or more removable media, one or more read only memories, one or more random access memories, one or more solid-state drives, one or more disks, including a hard disk, a floppy disk, an optical disk, a magnetic or optical card, or any type of non-transitory media suitable for storing electronic information, or any combination thereof.

The electronic communication interface 1370 may be a wireless antenna, as shown, a wired communication port, an optical communication port, or any other wired or wireless unit capable of interfacing with a wired or wireless electronic communication medium 1500.

The electronic communication unit 1320 may be configured to transmit or receive signals via the wired or wireless electronic communication medium 1500, such as via the electronic communication interface 1370. Although not explicitly shown in FIG. 1, the electronic communication unit 1320 is configured to transmit, receive, or both via any wired or wireless communication medium, such as radio frequency (RF), ultraviolet (UV), visible light, fiber optic, wire line, or a combination thereof. Although FIG. 1 shows a single one of the electronic communication unit 1320 and a single one of the electronic communication interface 1370, any number of communication units and any number of communication interfaces may be used. In some embodiments, the electronic communication unit 1320 can include a dedicated short-range communications (DSRC) unit, a wireless safety unit (WSU), IEEE 802.11p (Wifi-P), a cellular communication unit such as a long-term evolution (LTE) or 5G transceiver, or a combination thereof.

The location unit 1310 may determine geolocation information, including but not limited to longitude, latitude, elevation, direction of travel, or speed, of the vehicle 1050. For example, the location unit includes a global positioning system (GPS) unit, such as a wide area augmentation system (WAAS) enabled National Marine-Electronics Association (NMEA) unit, a radio triangulation unit, or a combination thereof. The location unit 1310 can be used to obtain information that represents, for example, a current heading of the vehicle 1050, a current position of the vehicle 1050 in two or three dimensions, a current angular orientation of the vehicle 1050, or a combination thereof.

The user interface 1350 may include any unit capable of being used as an interface by a person, including any of a virtual keypad, a physical keypad, a touchpad, a display, a touchscreen, a speaker, a microphone, a video camera, a sensor, and a printer. The user interface 1350 may be operatively coupled with the processor 1330, as shown, or with any other element of the controller 1300. Although shown as a single unit, the user interface 1350 can include one or more physical units. For example, the user interface 1350 includes an audio interface for performing audio communication with a person, and a touch display for performing visual and touch based communication with the person.

The sensor 1360 may include one or more sensors, such as an array of sensors, which may be operable to provide information that may be used to control the vehicle. The sensor 1360 can provide information regarding current operating characteristics of the vehicle or its surrounding. The sensors 1360 include, for example, a speed sensor, acceleration sensors, a steering angle sensor, traction-related sensors, braking-related sensors, or any sensor, or combination of sensors, that is operable to report information regarding some aspect of the current dynamic situation of the vehicle 1050.

In some embodiments, the sensor 1360 may include sensors that are operable to obtain information regarding the physical environment surrounding the vehicle 1050. For example, one or more sensors detect road geometry and obstacles, such as fixed obstacles, vehicles, cyclists, and pedestrians. In some embodiments, the sensor 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensor 1360 and the location unit 1310 are combined.

Although not shown separately, the vehicle 1050 may include a trajectory controller. For example, the controller 1300 may include a trajectory controller. The trajectory controller may be operable to obtain information describing a current state of the vehicle 1050 and a route planned for the vehicle 1050, and, based on this information, to determine and optimize a trajectory for the vehicle 1050. In some embodiments, the trajectory controller outputs signals operable to control the vehicle 1050 such that the vehicle 1050 follows the trajectory that is determined by the trajectory controller. For example, the output of the trajectory controller can be an optimized trajectory that may be supplied to the powertrain 1200, the wheels 1400/1410/1420/1430, or both. In some embodiments, the optimized trajectory can control inputs such as a set of steering angles, with each steering angle corresponding to a point in time or a position. In some embodiments, the optimized trajectory can be one or more paths, lines, curves, or a combination thereof.

One or more of the wheels 1400/1410/1420/1430 may be a steered wheel, which is pivoted to a steering angle under control of the steering unit 1230, a propelled wheel, which is torqued to propel the vehicle 1050 under control of the transmission 1220, or a steered and propelled wheel that steers and propels the vehicle 1050.

A vehicle may include units, or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

Figure 2:
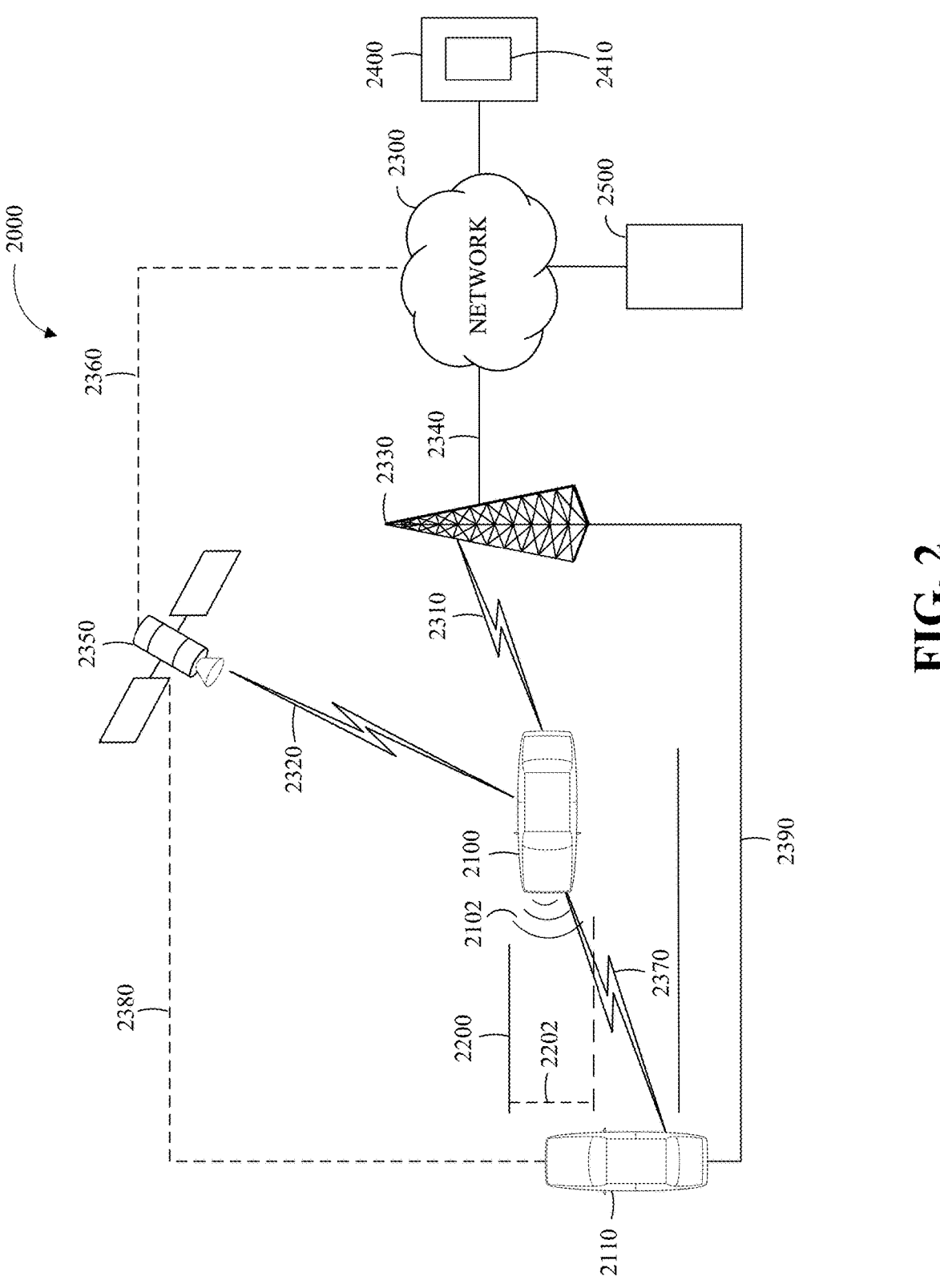
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system 2000 in which the aspects, features, and elements disclosed herein may be implemented. The vehicle transportation and communication system 2000 includes a vehicle 2100, such as the vehicle 1050 shown in FIG. 1, and one or more external objects, such as an external object 2110, which can include any form of transportation, such as the vehicle 1050 shown in FIG. 1, a pedestrian, cyclist, as well as any form of a structure, such as a building. The vehicle 2100 may travel via one or more portions of a transportation network 2200, and may communicate with the external object 2110 via one or more of an electronic communication network 2300. Although not explicitly shown in FIG. 2, a vehicle may traverse an area that is not expressly or completely included in a transportation network, such as an off-road area. In some embodiments the transportation network 2200 may include one or more of a vehicle detection sensor 2202, such as an inductive loop sensor, which may be used to detect the movement of vehicles on the transportation network 2200.

The electronic communication network 2300 may be a multiple access system that provides for communication, such as voice communication, data communication, video communication, messaging communication, or a combination thereof, between the vehicle 2100, the external object 2110, and an operations center 2400. For example, the vehicle 2100 or the external object 2110 may receive information, such as information representing the transportation network 2200, from the operations center 2400 via the electronic communication network 2300.

The operations center 2400 includes a controller apparatus 2410 which includes some or all of the features of the controller 1300 shown in FIG. 1. The controller apparatus 2410 can monitor and coordinate the movement of vehicles, including autonomous vehicles. The controller apparatus 2410 may monitor the state or condition of vehicles, such as the vehicle 2100, and external objects, such as the external object 2110. The controller apparatus 2410 can receive vehicle data and infrastructure data including any of: vehicle velocity; vehicle location; vehicle operational state; vehicle destination; vehicle route; vehicle sensor data; external object velocity; external object location; external object operational state; external object destination; external object route; and external object sensor data.

Further, the controller apparatus 2410 can establish remote control over one or more vehicles, such as the vehicle 2100, or external objects, such as the external object 2110. In this way, the controller apparatus 2410 may teleoperate the vehicles or external objects from a remote location. The controller apparatus 2410 may exchange (send or receive) state data with vehicles, external objects, or computing devices such as the vehicle 2100, the external object 2110, or a server computing device 2500, via a wireless communication link such as the wireless communication link 2380 or a wired communication link such as the wired communication link 2390.

The server computing device 2500 may include one or more server computing devices which may exchange (send or receive) state signal data with one or more vehicles or computing devices including the vehicle 2100, the external object 2110, or the operations center 2400, via the electronic communication network 2300.

In some embodiments, the vehicle 2100 or the external object 2110 communicates via the wired communication link 2390, a wireless communication link 2310/2320/2370, or a combination of any number or types of wired or wireless communication links. For example, as shown, the vehicle 2100 or the external object 2110 communicates via a terrestrial wireless communication link 2310, via a non-terrestrial wireless communication link 2320, or via a combination thereof. In some implementations, a terrestrial wireless communication link 2310 includes an Ethernet link, a serial link, a Bluetooth link, an infrared (IR) link, an ultraviolet (UV) link, or any link capable of providing for electronic communication.

A vehicle, such as the vehicle 2100, or an external object, such as the external object 2110 may communicate with another vehicle, external object, or the operations center 2400. For example, a host, or subject, vehicle 2100 may receive one or more automated inter-vehicle messages, such as a basic safety message (BSM), from the operations center 2400, via a direct communication link 2370, or via an electronic communication network 2300. For example, operations center 2400 may broadcast the message to host vehicles within a defined broadcast range, such as three hundred meters, or to a defined geographical area. In some embodiments, the vehicle 2100 receives a message via a third party, such as a signal repeater (not shown) or another remote vehicle (not shown). In some embodiments, the vehicle 2100 or the external object 2110 transmits one or more automated inter-vehicle messages periodically based on a defined interval, such as one hundred milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system state data, throttle information, steering wheel angle information, or vehicle routing information, or vehicle operating state information, such as vehicle size information, headlight state information, turn signal information, wiper state data, transmission information, or any other information, or combination of information, relevant to the transmitting vehicle state. For example, transmission state information indicates whether the transmission of the transmitting vehicle is in a neutral state, a parked state, a forward state, or a reverse state.

In some embodiments, the vehicle 2100 communicates with the electronic communication network 2300 via an access point 2330. The access point 2330, which may include a computing device, may be configured to communicate with the vehicle 2100, with the electronic communication network 2300, with the operations center 2400, or with a combination thereof via wired or wireless communication links 2310 or wireless communication link 2340. For example, an access point 2330 is a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point can include any number of interconnected elements.

The vehicle 2100 may communicate with the electronic communication network 2300 via a satellite 2350, or other non-terrestrial communication device. The satellite 2350, which may include a computing device, may be configured to communicate with the vehicle 2100, with the electronic communication network 2300, with the operations center 2400, or with a combination thereof via one or more communication links 2320 or wireless communication link 2360. Although shown as a single unit, a satellite can include any number of interconnected elements.

The electronic communication network 2300 may be any type of network configured to provide for voice, data, or any other type of electronic communication. For example, the electronic communication network 2300 includes a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the Hyper Text Transport Protocol (HTTP), or a combination thereof. Although shown as a single unit, an electronic communication network can include any number of interconnected elements.

In some embodiments, the vehicle 2100 communicates with the operations center 2400 via the electronic communication network 2300, access point 2330, or satellite 2350. The operations center 2400 may include one or more computing devices, which are able to exchange (send or receive) data from: vehicles such as the vehicle 2100; external objects including the external object 2110; or computing devices such as the server computing device 2500.

In some embodiments, the vehicle 2100 identifies a portion or condition of the transportation network 2200. For example, the vehicle 2100 may include one or more on-vehicle sensors 2102, such as the sensor 1360 shown in FIG. 1, which includes a speed sensor, a wheel speed sensor, a camera, a gyroscope, an optical sensor, a laser sensor, a radar sensor, a sonic sensor (e.g., a microphone or acoustic sensor), a compass, or any other sensor or device or combination thereof capable of determining or identifying a portion or condition of the transportation network 2200.

The vehicle 2100 may traverse one or more portions of the transportation network 2200 using information communicated via the electronic communication network 2300, such as information representing the transportation network 2200, information identified by one or more on-vehicle sensors 2102, or a combination thereof. The external object 2110 may be capable of all or some of the communications and actions described above with respect to the vehicle 2100.

For simplicity, FIG. 2 shows the vehicle 2100 as the host vehicle, the external object 2110, the transportation network 2200, the electronic communication network 2300, and the operations center 2400. However, any number of vehicles, networks, or computing devices may be used. In some embodiments, the vehicle transportation and communication system 2000 includes devices, units, or elements not shown in FIG. 2. Although the vehicle 2100 or external object 2110 is shown as a single unit, a vehicle can include any number of interconnected elements.

Although the vehicle 2100 is shown communicating with the operations center 2400 via the electronic communication network 2300, the vehicle 2100 (and external object 2110) may communicate with the operations center 2400 via any number of direct or indirect communication links. For example, the vehicle 2100 or external object 2110 may communicate with the operations center 2400 via a direct communication link, such as a Bluetooth communication link. Although, for simplicity, FIG. 2 shows one of the transportation network 2200, and one of the electronic communication network 2300, any number of networks or communication devices may be used.

Figure 3:
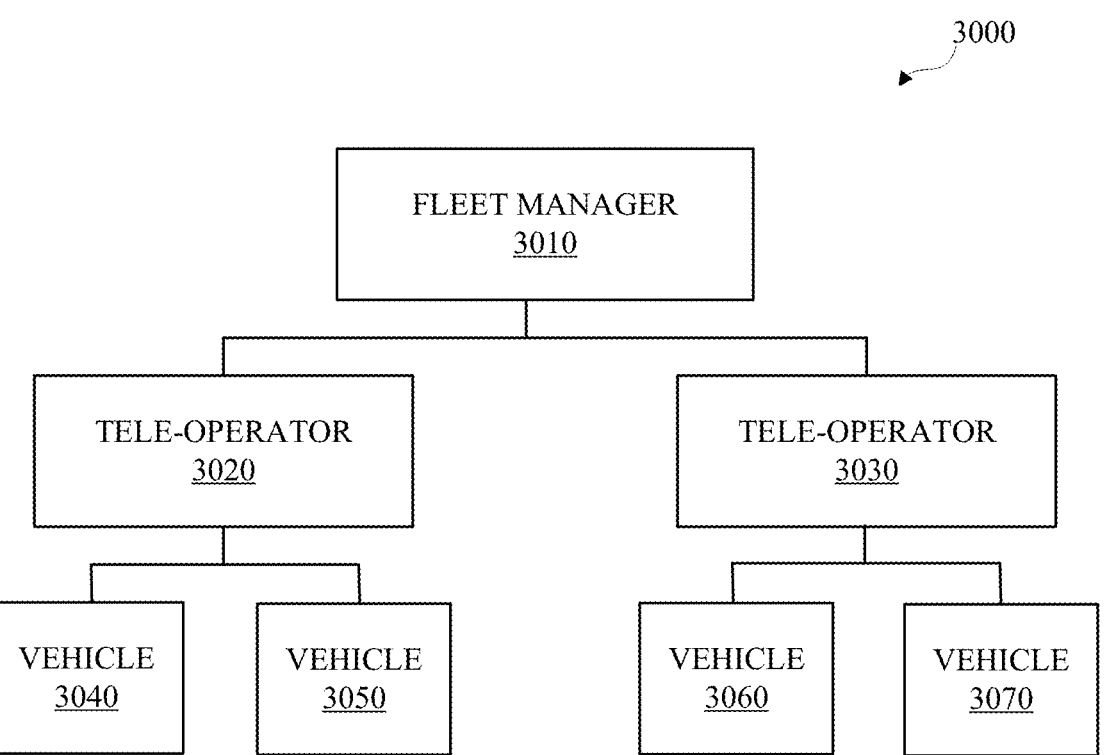
FIG. 3 is a block diagram illustrating a remote vehicle assistance center according to implementations of this disclosure.

FIG. 3 is a block diagram illustrating a remote vehicle assistance center 3000 according to implementations of this disclosure. The remote vehicle assistance center 3000 can also be referred to as a remote system or a tele-operations center. The remote vehicle assistance center 3000 includes a fleet manager 3010, a plurality of vehicle managers (i.e., tele-operators) including but not limited to a tele-operator 3020 and a tele-operator 3030, and a plurality of vehicles including but not limited to vehicles 3040, 3050, 3060, and 3070.

The fleet manager 3010 can include an apparatus including some or all of the features of the controller 1300 shown in FIG. 1 or the controller apparatus 2410 of FIG. 2. The fleet manager 3010 can monitor and coordinate tele-operators, including the tele-operators 3020/3030 as well as the movement of vehicles, including autonomous vehicles, and the vehicles 3040, 3050, 3060, and 3070. Monitoring and coordinating the tele-operators can include any of assigning, allocating, or deallocating vehicles to the tele-operators; reviewing and monitoring performance data of the tele-operators; and assigning tele-operators to a geographic area. In an implementation, there can be multiple fleet managers, who may in turn be managed or under the authority of other fleet managers.

The tele-operator 3020 can monitor the state or condition of vehicles, including the vehicle 3040 and the vehicle 3050. As illustrated in FIG. 3, the tele-operator 3020 has been assigned vehicle 3040 and vehicle 3050. The assignment of vehicles to a tele-operator can be performed by a fleet manager such as the fleet manager 3010.

The tele-operator 3030 can monitor the state or condition of vehicles, including the vehicle 3060 and the vehicle 3070. As illustrated in FIG. 3, the tele-operator 3030 has been assigned vehicle 3060 and vehicle 3070. The assignment of vehicles to a tele-operator can be performed by a fleet manager such as the fleet manager 3010. The assignment of vehicles to a tele-operator can also be automated using machine learning techniques.

In an implementation, the tele-operators can cluster or group the vehicles, establish communication with occupants in the vehicle, remotely operate the vehicles, and coordinate the movement of the vehicles through a transportation network or around various obstacles such as traffic congestion. The tele-operators can interact with other tele-operators to aid in the monitoring and management of the vehicles.

The vehicles including the vehicle 3040/3050/3060/3070 comprise vehicles such as the vehicle 2100 as shown in FIG. 2, that are being monitored or coordinated by the fleet manager 3010. The vehicles can be operated autonomously or by a human driver and can exchange (send and receive) vehicle data relating to the state or condition of the vehicle and its surroundings including any of vehicle velocity;

vehicle location; vehicle operational state; vehicle destination; vehicle route; vehicle sensor data; external object velocity; and external object location.

In the description herein, sentences describing the autonomous vehicle as taking an action (such as performing, determining, initiating, receiving, calculating, deciding, etc.) are to be understood that some appropriate module of the AV as taking the action. Such modules may be stored in a memory of the AV, such as the memory 1340 of FIG. 1, and executed by a processor, such as the processor 1330 of FIG. 1. Such modules may be partially or fully included in a controller apparatus, such as the controller apparatus 2410 of FIG. 2 and may be partially or fully executed by a processor of the AV, a processor of an operations center, or a combination thereof. For example, the statement "the AV determines a trajectory" can be understood to mean that "a module of the AV determines a trajectory" or "a trajectory planning module of the AV determines a trajectory."

Figure 4:
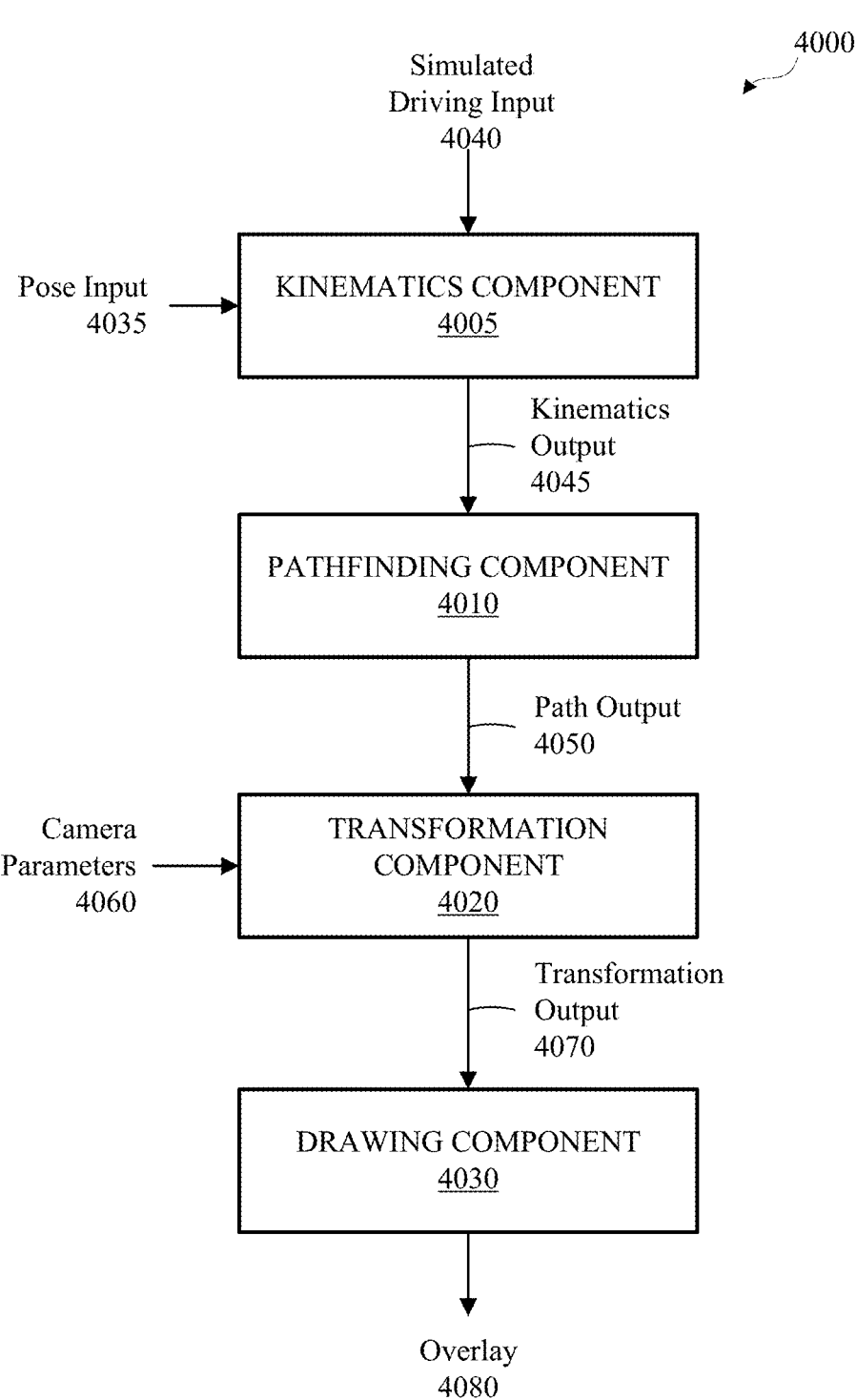
FIG. 4 is a block diagram of an example of a system for displaying an overlay including a representation of a simulated lead vehicle and a projected path thereof.

FIG. 4 is a block diagram of an example of a system 4000 for displaying an overlay 4080 including a vehicle, a simulated lead vehicle, and a projected path of the simulated lead vehicle. For brevity, the "simulated lead vehicle" may be referred to as the "simulated vehicle" or the "lead vehicle" herein. For example, the system 4000 could be implemented by the controller apparatus 2410 of FIG. 2. In another example, the system 4000 could be implemented by computing devices or a server of the operations center 2400. The system 4000 could be used by a tele-operator to perform tele-operation of a vehicle, such as the tele-operators 3020/ 3030 performing tele-operation of the vehicle 3040/3050/ 3060/3070 of FIG. 3.

The system 4000 may include a kinematics component 4005, a pathfinding component 4010, a transformation component 4020, and a drawing component 4030. The system 4000 can receive a video stream from a camera of a vehicle (e.g., the sensor 1360 of the vehicle 1050 of FIG. 1) in a transportation network (e.g., the vehicle 2100 in the transportation network 2200 of FIG. 2). For example, the camera could be configured as a front facing camera arranged on top of the vehicle. The system 4000 can also receive a simulated driving input 4040 based on input from a tele-operator. The simulated driving input 4040 may indicate a steering angle and/or an acceleration for the simulated vehicle, which may be received via a tele-operation apparatus operated by the tele-operator, such as a game controller, a joystick, a keyboard, a mouse, a steering wheel, an accelerator pedal, a brake pedal, or any combination thereof. The term "acceleration" encompasses both positive acceleration and negative acceleration, i.e., deceleration, where a positive acceleration input may comprise pressing of an accelerator pedal of a driving simulator cockpit and a negative acceleration input may comprise releasing of the accelerator pedal or pressing of a brake pedal of the driving simulator cockpit. The system 4000 can also receive a vehicle location and orientation input, i.e., a pose input 4035, that represents: (i) a location of the vehicle, for example, as spatial coordinates having been determined by a global positioning system (GPS) system; and (ii) an orientation of the vehicle, for example, as yaw, pitch, and roll angles having been determined by a GPS system and/or an inertial measurement unit (IMU) system. The system 4000 can then determine locations and orientations, i.e., poses, of the vehicle, the simulated vehicle, and the projected path of the simulated vehicle in the transportation network based on the pose input 4035 and the simulated driving input 4040. For example, the system 4000 can utilize the kinematics component 4005 to determine the location and orientation, i.e., pose, of the simulated vehicle and the projected path of the simulated vehicle in the transportation network. The kinematics component 4005 can take the simulated driving input 4040, such as the steering angle and/or the acceleration, and compute a motion of the simulated vehicle with respect to the vehicle. The kinematics component 4005 can then utilize trigonometric and/or geometric calculations to determine three-dimensional spatial coordinates and orientation angles of the simulated vehicle to generate a kinematics output 4045 that includes a pose of the simulated vehicle. In some embodiments, the location of the simulated vehicle may be represented by a tuple of three-dimensional spatial coordinates, for example $(x, y, z)$, that corresponds to the location of a predetermined point of the simulated vehicle, for example, the location of a medial point on a rear axle of the simulated vehicle. In some embodiments, the orientation of the simulated vehicle may be represented by a tuple of rotational angles about respective orthogonal axes, for example $(\varphi, \theta, \zeta)$, having an origin at a predetermined point of the simulated vehicle, for example the medial point on a rear axle of the simulated vehicle. The pathfinding component 4010 can take the simulated driving input 4040, such as the steering angle and/or the acceleration for the simulated vehicle, and the kinematics output 4045, and utilize the Ackermann model to determine a radius of a curve of the projected path of the simulated vehicle. The pathfinding component 4010 can then utilize trigonometric and/or geometric calculations to determine three-dimensional spatial coordinates of the projected path of the simulated vehicle to generate a path output 4050.

Figure 5:
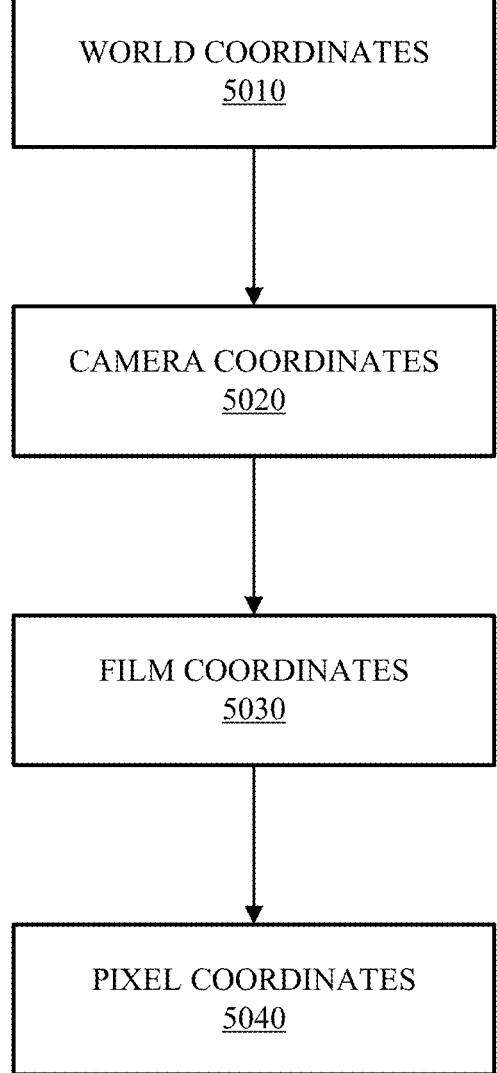
FIG. 5 is an example of transforming spatial coordinates to pixel coordinates.

With additional reference to FIG. 5, in some cases, the spatial coordinates determined by the kinematics component 4005 and/or the pathfinding component 4010 may be world coordinates 5010. For example, the world coordinates 5010 may be coordinates relative to the transportation network (e.g., the transportation network 2200). In some cases, the spatial coordinates determined by the kinematics component 4005 and/or pathfinding component 4010 may be camera coordinates 5020. For example, the camera coordinates 5020 may be coordinates relative to the camera of the vehicle. When the spatial coordinates are the world coordinates 5010, the transformation component 4020 can convert the world coordinates 5010 to the camera coordinates 5020.

Referring again to FIG. 4, the system 4000 can determine, from the spatial coordinates, two-dimensional pixel coordinates in a video stream and/or a map stream corresponding to the location of the vehicle, the simulated vehicle, and the projected path of the simulated vehicle. For example, the system 4000 can utilize the transformation component 4020 to process the spatial coordinates from the kinematics output 4045 and/or the path output 4050. The transformation component 4020 can reference camera parameters 4060 that are intrinsic to the camera of the vehicle to determine the pixel coordinates. For example, the camera parameters 4060 could indicate a pose of the camera, such as the camera's location on the vehicle and the camera's height above ground, and/or a resolution of the camera. The transformation component 4020 can convert the spatial coordinates into pixel coordinates, based on the camera parameters 4060, to generate a transformation output 4070.

With additional reference to FIG. 5, the transformation component 4020 can convert the spatial coordinates (e.g., the world coordinates 5010 or the camera coordinates 5020) into film coordinates 5030. The film coordinates 5030 may correspond to coordinates in a focal plane of the camera (e.g., the video stream). The transformation component 4020 can further convert the film coordinates 5030 into pixel coordinates 5040. The pixel coordinates 5040 can correspond to coordinates of pixels in the GUI or a hypertext markup language (HTML) canvas used by the tele-operator.

Referring again to FIG. 4, the system 4000 can utilize the drawing component 4030 to generate a first overlay 4080 that is output to the GUI or HTML canvas used by the tele-operator. The first overlay 4080 may comprise a representation of the simulated vehicle at a location in the video stream based on the pixel coordinates (e.g., the pixel coordinates 5040) and orientation of the simulated vehicle. The drawing component 4030 can draw the simulated-vehicle portion of the first overlay 4080 in the video stream. In some embodiments, the simulated vehicle may be represented by limited components of a vehicle, (e.g., only wheels and a chassis), and in other embodiments the simulated vehicle may be represented by a complete vehicle (e.g., a body). In some embodiments, the simulated vehicle may be represented by a wireframe, a bounding box, one or more shapes, a rendering, or any combination thereof. In some embodiments, the simulated-vehicle portion of the first overlay 4080, or portions thereof, may be drawn as opaque, translucent, or transparent in the video stream. The first overlay 4080 may further comprise a representation of the projected path of the simulated vehicle based on the pixel coordinates (e.g., the pixel coordinates 5040) and orientation of the simulated vehicle. The drawing component 4030 can apply spline interpolation based on the pixel coordinates, and can draw a visualization of the projected-path portion of the first overlay 4080 as a smooth curve representing the projected path in the video stream. In some embodiments, the projected-path portion of the first overlay 4080, or portions thereof, may be drawn as opaque, translucent, or transparent in the video stream.

Referring again to FIG. 4, the system 4000 can utilize the drawing component 4030 to generate a second overlay 4080 that is output to the GUI or HTML canvas used by the tele-operator. In some embodiments, the first and second overlays may be considered a same overlay. The second overlay 4080 may comprise a representation of the vehicle at a location on the map stream based on the pixel coordinates (e.g., the pixel coordinates 5040) and orientation of the vehicle. The drawing component 4030 can draw the vehicle portion of the second overlay 4080 on the map stream. In some embodiments, the vehicle may be represented by limited components of a vehicle, (e.g., only wheels and a chassis), and in other embodiments the vehicle may be represented by a complete vehicle (e.g., a body). In some embodiments, the vehicle may be represented by a wireframe, a bounding box, one or more shapes, a rendering, or any combination thereof. In some embodiments, the vehicle portion of the second overlay 4080, or portions thereof, may be drawn as opaque, translucent, or transparent in the video stream.

The second overlay 4080 may further comprise a representation of the simulated vehicle at a location on the map stream based on the pixel coordinates (e.g., the pixel coordinates 5040) and orientation of the simulated vehicle. The drawing component 4030 can draw the simulated-vehicle portion of the second overlay 4080 on the map stream. In some embodiments, the simulated vehicle may be represented by limited components of a vehicle, (e.g., only wheels and a chassis), and in other embodiments the simulated vehicle may be represented by a complete vehicle (e.g., a body). In some embodiments, the simulated vehicle may be represented by a wireframe, a bounding box, one or more shapes, a rendering, or any combination thereof. In some embodiments, the simulated-vehicle portion of the second overlay 4080, or portions thereof, may be drawn as opaque, translucent, or transparent on the map stream. The second overlay 4080 may further comprise a representation of the projected path of the simulated vehicle based on the pixel coordinates (e.g., the pixel coordinates 5040) and orientation of the simulated vehicle. The drawing component 4030 can apply spline interpolation based on the pixel coordinates, and can draw a visualization of the projected-path portion of the second overlay 4080 as a smooth curve representing the projected path on the map stream. The drawing component 4030 can further draw a visualization of the projected-path portion of the second overlay 4080 as a smooth curve representing the projected path on the map stream. In some embodiments, the projected-path portion of the second overlay 4080, or portions thereof, may be drawn as opaque, translucent, or transparent in the video stream.

Figure 6:
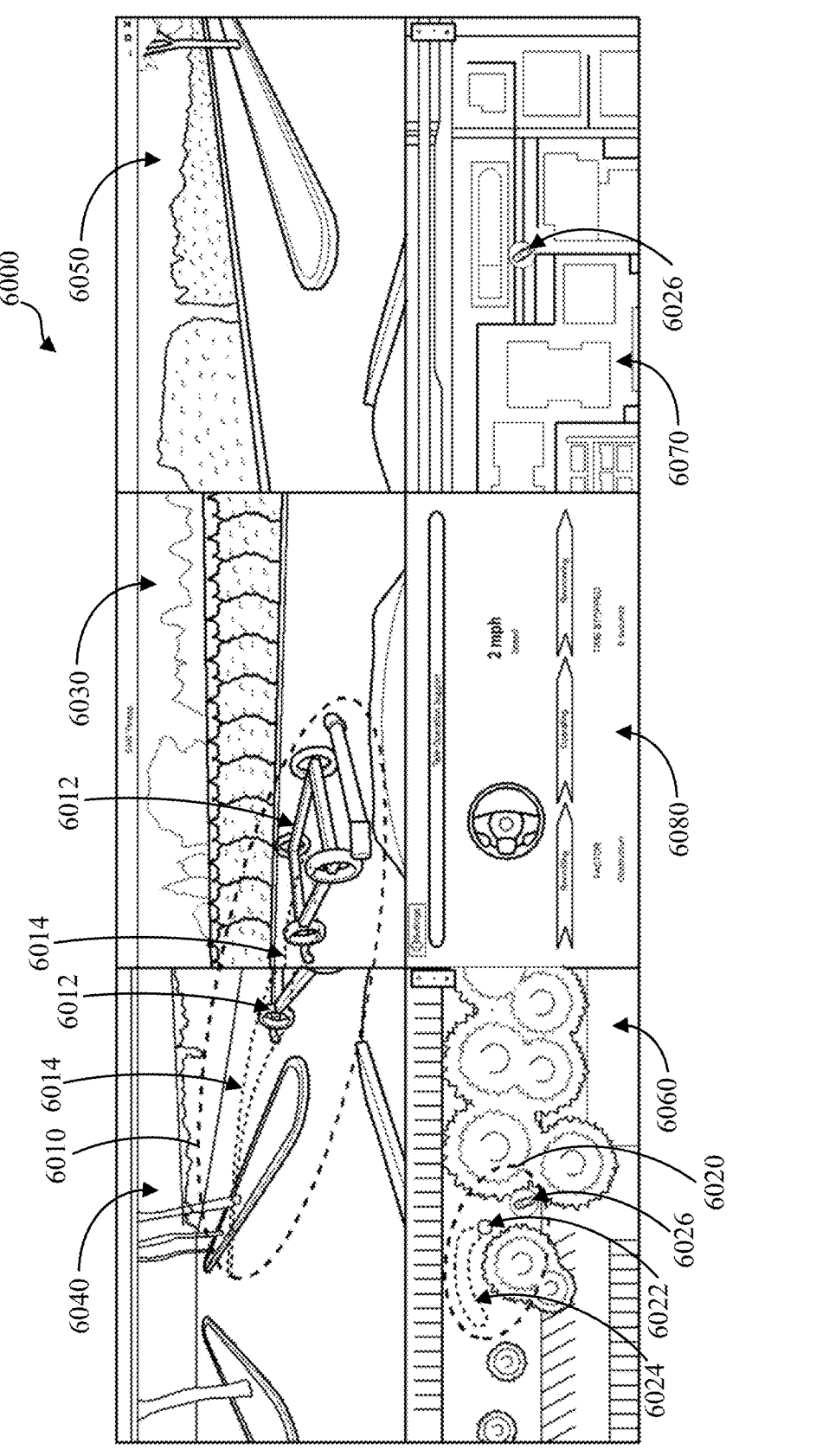
FIG. 6 is an example of a graphical user interface (GUI) displaying an overlay including a simulated lead vehicle and a projected path thereof.

FIG. 6 is an example of a GUI 6000 displaying an overlay 6010 and an overlay 6020. In some embodiments, the overlay 6010 and the overlay 6020 may be considered a same overlay, for example, the overlay 4080 of FIG. 4. The overlay 6010 may include a simulated vehicle overlay 6012 and a projected path overlay 6014 of the simulated vehicle, each of which may be independently drawn on one or more video streams. The overlay 6020 may include a simulated vehicle overlay 6022, a projected path overlay 6024 of the simulated vehicle, and a vehicle overlay 6026, each of which may be independently drawn on one or more map streams. The GUI 6000 could be used to assist a tele-operator to perform tele-operation of the vehicle, such as the tele-operators 3020/3030 performing tele-operation of the vehicle 3040/3050/3060/3070 of FIG. 3. For example, the system 4000 of FIG. 4 can generate the overlay 6010 and the overlay 6020, together corresponding to the overlay 4080 of FIG. 4. The GUI 6000 could comprise an HTML canvas or webpage displayed through a web interface; the GUI could comprise one or more display monitors; and/or the GUI 6000 could comprise one or more augmented reality displays, for example, via an augmented reality headset.

The GUI 6000 may include a video stream 6030 from a camera of a vehicle in a transportation network (e.g., the vehicle 2100 in the transportation network 2200 of FIG. 2). For example, the video stream 6030 could correspond to a camera configured as a front facing camera arranged on top of the vehicle. In some implementations, the GUI 6000 may include additional video streams from additional cameras of the vehicle. For example, the GUI 6000 may include a second video stream 6040 from a second camera configured as a left facing camera, and a third video stream 6050 from a third camera configured as a right facing camera. The additional cameras may provide additional views for the tele-operator to further improve situational awareness. The overlay 6010, or portions thereof, may be drawn in the video streams of multiple cameras independently and/or simultaneously, at pixel coordinates of the respective video streams (e.g., pixel coordinates 5040). For example, FIG. 6 shows the overlay 6010 drawn in the video stream 6030 and in the second video stream 6040.

The GUI 6000 may include one or more map streams, from a mapping service, depicting aerial (plan) views of an environment in a vicinity of the vehicle (e.g., the vehicle 2100 in the transportation network 2200 of FIG. 2). For example, the GUI 6000 could include a satellite map stream 6060 that comprises aerial satellite images of the environment, and a road map stream 6070 that comprise abstracted representations of the environment via lines, shapes, symbols, colors, ab so on. The map streams 6060 and 6070 may provide additional views for the tele-operator to further improve situational awareness. The overlay 6020, or portions thereof, may be drawn on multiple map streams independently and/or simultaneously, at pixel coordinates of the respective map streams (e.g., pixel coordinates 5040). For example, FIG. 6 shows the overlay 6020 (comprising a vehicle overlay 6026, a simulated vehicle overlay 6022, and a projected path overlay 6024) drawn on the satellite map stream 6060 and a simulated vehicle overlay 6026 drawn on the road map stream 6070.

The GUI 6000 may include a tele-operation support area 6080 to display information that may further improve tele-operational situational awareness. For example, the tele-operation support area 6080 may display information related to the simulated driving input 4040 of FIG. 4, such as the steering angle and/or an acceleration for the simulated vehicle. The tele-operation support area 6080 may further display a speed of the simulated vehicle or a distance between the simulated vehicle and the vehicle. Such speed and/or distance may be determined by the kinematics component 4005 of the system 4000. The tele-operation support area 6080 may further display information related to a current procedure of tele-operation, such as whether the vehicle is requesting tele-operation (e.g., "Requesting"), whether tele-operation is underway ("Operating"), or whether the vehicle is recovering from tele-operation and reverting back to an autonomous driving mode ("Recovering"). The tele-operation support area 6080 may further display information related to one or more factors why the vehicle has requested tele-operation, such as detection and/ or identification of an obstruction that cannot be appropriately, adequately, or safely, circumnavigated autonomously (e.g., "Obstruction").

In some cases, the video streams 6030, 6040, and 6050 that may be viewed by a tele-operator may be delayed with respect to the real-time video captured by the one or more cameras of the vehicle in the transportation network (e.g., the vehicle 2100 in the transportation network 2200 of FIG. 2). This delay can be caused by data transmission delay (e.g., network latency) between the vehicle in the transportation network, e.g., on a road, and the system 4000. Consequently, if the tele-operator were to assume direct tele-operative control of the vehicle, the tele-operator would experience a responsive lag caused by a first delay in transmitting tele-operation instructions to the vehicle (e.g., steering angle or acceleration) and a second delay in receiving the subsequent video streams from the vehicle that may reflect an updated location and/or orientation of the vehicle as a result of carrying out received tele-operation instructions. Such a responsiveness lag can make direct tele-operation of the vehicle difficult and/or unsafe. However, for the embodiments described herein, the tele-operator assumes direct operation of a simulated lead vehicle instead of the vehicle, and the vehicle follows a path determined by locations of the simulated vehicle. In this way, the tele-operator is indirectly operating the vehicle. Because the system 4000 can receive the simulated driving input 4040 without incurring the aforementioned transmission delays between the vehicle on the road and the system 4000, the drawing component 4030 can draw the overlay 6010 (e.g., the overlay 4080 of FIG. 4) in the video streams 6030, 6040, and/or 6050 in near real-time with respect to the simulated driving input 4040. Thus, the tele-operator does not experience the responsiveness lag that may be caused by data transmission delays (e.g., network latency).

Figure 7:
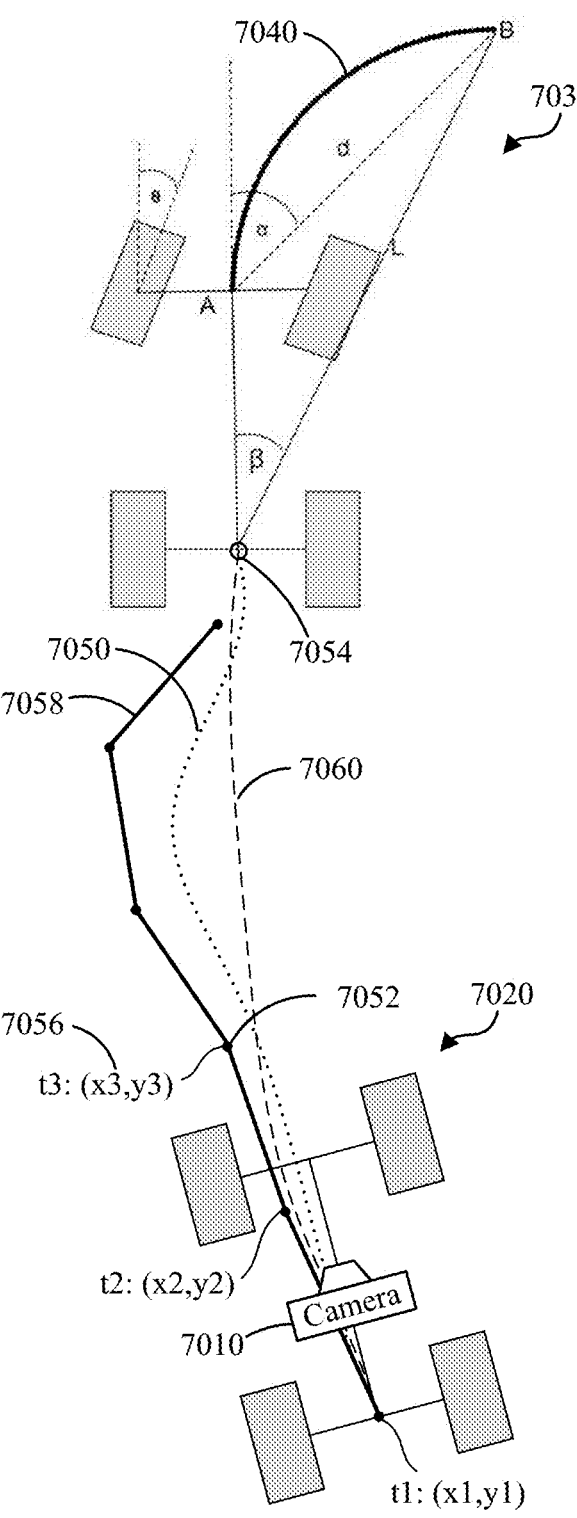
FIG. 7 is a diagram of an example of determining a projected path of a simulated lead vehicle and a breadcrumb trail of the simulated lead vehicle for use by a path planning process of an autonomous vehicle.

The pathfinding component 4010 can determine the projected path 6014 of the simulated vehicle based on motion data associated with the simulated vehicle. For example, given the simulated driving input 4040 (e.g., previous and/or current steering angle and acceleration), the pathfinding component 4010 can determine the path the simulated vehicle may take. With additional reference to FIG. 7, 7020 represents the vehicle including a camera 7010 thereon (e.g., the vehicle 2100 in the transportation network 2200 of FIG. 2), and 7030 represents the simulated vehicle. The angle θ is the steering angle indicated by the simulated driving input 4040 and the point A is the mid-point of the front axle of the simulated vehicle. The distance between points A and B may be "d" meters, where d may be a value representing a projected length of the projected path 6014 determined by either: (i) a preconfigured or user-configurable distance; or (ii) a distance computed by the kinematics component 4005 based on a preconfigured or user-configurable time duration, a speed of the simulated vehicle, and an acceleration of the lead vehicle (e.g., via the kinematics equation $d=s(t)+(1/2)(a)(t^2)$, where d is distance, s is speed, t is time duration, and a is acceleration). Given the angle θ and the distance d, the pathfinding component 4010 can determine the bolded curved path 7040 that the simulated vehicle will take to reach the point B (e.g., the projected path 6014 in FIG. 6). Note that the pathfinding component 4010 might not have the location of the point B or the angle α. However, the pathfinding component 4010 can determine the radius of the curve using the angle θ. Once the curve is determined, the pathfinding component 4010 can determine the point B on the curve such that the length of AB is the distance d. Once the line AB is determined, the pathfinding component 4010 can find the angle α by utilizing trigonometric functions.

Figure 8:
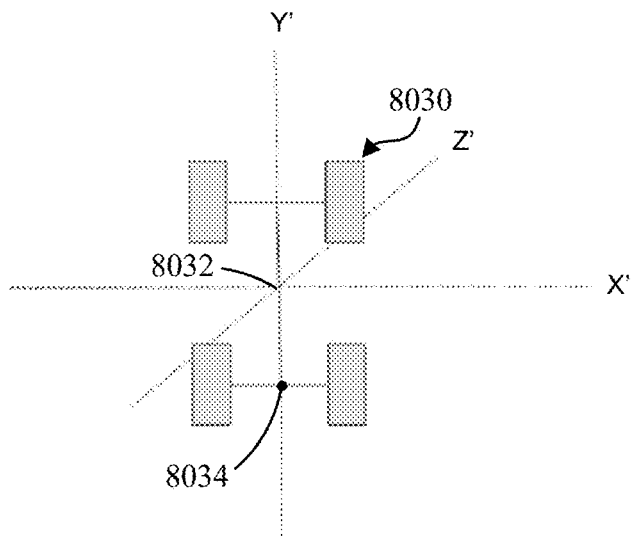
FIG. 8 is a diagram of an example of spatial coordinates in a transportation network.
Figure 8:
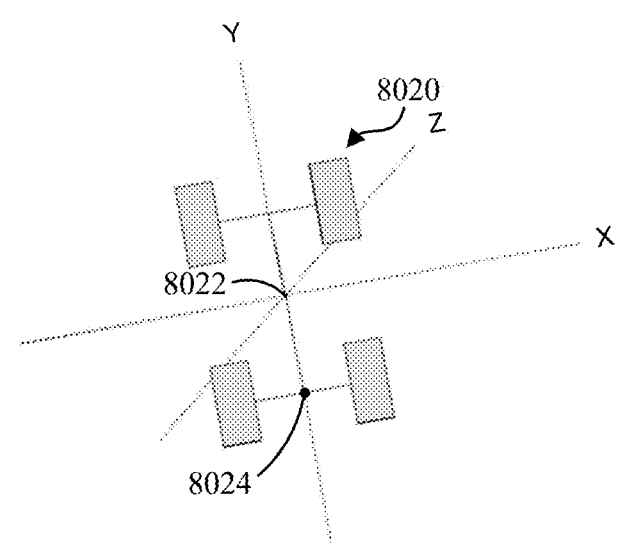

FIG. 8 shows representations of a vehicle 8020 and a simulated vehicle 8030, which may respectively represent the vehicle 7020 and simulated vehicle 7030 of FIG. 7. The coordinate system used by the pathfinding component 4010 may have an origin 8022 of the vehicle 8020 corresponding to the location of the camera 7010 of the vehicle 7020, which camera 7010 could be attached on the top of the vehicle 7020 at the mid-point thereof. In some cases, the camera 7010 may be at other locations of the vehicle 7020, and the transformation component 4020 can determine an offset between the origin 8022 and the other location, for example, to a midpoint of the rear axle 8024 of the vehicle 8020. In this example, a positive X-axis may be towards the right of the vehicle, a positive Z-axis may be in the up direction perpendicular to the ground, and a positive Y-axis may be towards the front of the vehicle.

Because the project path of the simulated vehicle (e.g., the projected path 6014 overlay of FIG. 6 or the bolded curved path 7040 of FIG. 7) corresponds to a path that the simulated vehicle may follow rather than a path that the vehicle may follow, it may be more convenient for the coordinate system used by the pathfinding component 4010 to have an origin 8032 of the simulated vehicle 8030, where the origin 8032 may correspond to any convenient point of the simulated vehicle 8030, for example, at the top of the simulated vehicle 8030 at the mid-point thereof, or at a midpoint of the rear axle 8034 of the simulated vehicle 8030. In such case, the kinematic component 4005 can determine an offset between any point on the vehicle 8020 and any point on the simulated vehicle 8030, for example, an offset between the origin 8022 (or rear axle 8024) of the vehicle 8020 and the origin 8032 (or rear axle 8034) of the simulated vehicle 8030, where the offset is a function of the relative distance and orientation of the simulated vehicle 8030 with respect to the vehicle 8020. In this example, a positive X'-axis may be towards the right of the simulated vehicle, a positive Z'-axis may be in the up direction perpendicular to the ground, and a positive Y'-axis may be towards the front of the simulated vehicle.

Referring again to FIG. 7, the simulated vehicle 7030 may be modeled after the vehicle 7020, such that the dimensions of the simulated vehicle 7030 may be identical to the dimensions of the vehicle 7020. Consequently, any point on the vehicle 7020 can be projected to an equivalent point on the simulated vehicle 7030, e.g., the coordinates of the camera 7010 installed on the vehicle 7020 can be projected to an equivalent point on the simulated vehicle 7030. For example, the coordinates of the wheels of the simulated vehicle can be determined utilizing the vehicle measurements, the location of the camera 7010 installed on the vehicle 7020, and the projection of coordinates from the vehicle 7020 to the simulated vehicle 7030. In one implementation, the coordinates of the camera 7010 of the vehicle 7020 could be projected to the simulated vehicle 7030 first, e.g., via the kinematics component 4005, and then the measurements of the vehicle 7020 could be applied to the simulated vehicle 7030 to find the coordinates of the wheels of the simulated vehicle 7030, e.g., via the pathfinding component 4010. In another implementation, the measurements of the vehicle 7020 could be applied to the vehicle 7020 first to determine the coordinates of the wheels of the vehicle 7020, e.g., via the pathfinding component 4010, and then those coordinates could be projected to the simulated vehicle 7030, e.g. via the kinematics component 4005.

As an example of the latter implementation, the camera 7010 could be installed on the line joining the mid-points of the front axle and rear axle of the vehicle, which may result in the following exemplary measurements:

Distance of the camera 7010 from the front axle: 1666 mm

Distance of the camera 7010 from the rear axle: 1030 mm

Track width of the vehicle: 1256 mm

Then the (X, Y) coordinate of the front left wheel may be (−1256/2, 1666)=(−628, 1666); the (X, Y) coordinate of the front right wheel may be (1256/2, 1666)=(628, 1666); the (X, Y) coordinate of the rear left wheel may be (−1256/2, −1030)=(−628, −1030); and the (X, Y) coordinate of the rear right wheel may be (1256/2, −1030)=(628, −1030).

The ground may be considered flat. As a result, the Z-coordinate of any point on the ground may be (−1*height of the camera). That is, if the camera 7010 is installed at a height of 1600 mm, the points on the ground could have a coordinate of −1600.

These coordinates can be projected to the simulated vehicle 7030.

Figure 9:
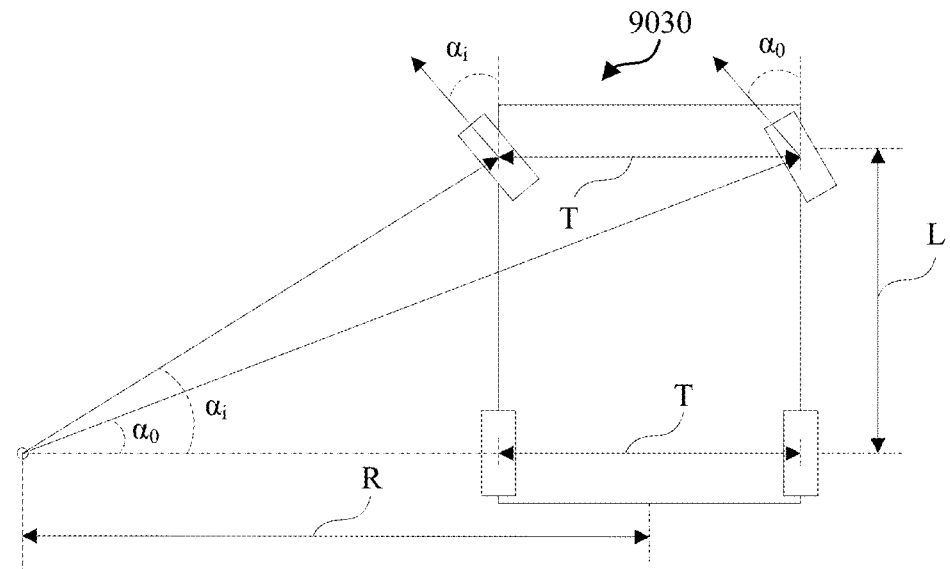
FIG. 9 is a diagram of an example of utilizing the Ackermann model.

With additional reference to FIG. 9, the pathfinding component 4010 can use Ackermann's model to find the radius of the curved paths with respect to a rear axle of a simulated vehicle 9030 (e.g., a simulated vehicle 7030 of FIG. 7 or 8030 of FIG. 8). For example, from the Ackermann model, we know that:

$$\alpha_i = \tan^{-1}(L/(R - T/2)) \qquad \text{(eq. 1)}$$

$$\alpha_0 = \tan^{-1}(L/(R + T/2)) \qquad \text{(eq. 2)}$$

The pathfinding component 4010 can utilize equation (1) or equation (2) to determine the radius "R." For example, using equation (1) to determine R:

$$R = (L/\tan(\alpha_i)) + T/2 \qquad \text{(eq. 3)}$$

The radius R is the radius of the curve that the mid-point of the rear axle will follow. Each point of the vehicle may follow a separate curve along the path. The pathfinding component 4010 can determine the curves followed by the front wheels and the mid-point of the front axle. For example, the pathfinding component 4010 can determine the aforementioned radii of those curves utilizing the measurements (T, L) and the Pythagorean theorem. These curves may be arcs of different concentric circles. The center of these circles may lie at R distance from the mid-point of the rear axle as shown in FIG. 9. The center may lie either on the left or the right side of the rear axle depending on the turn direction. Determining the turn direction and R, the pathfinding component 4010 can determine the coordinate of the center using the coordinate system explained with respect to FIG. 8.

Referring again to FIG. 7, a path 7060 (shown as a dashed line) that the vehicle 7020 may follow can be based on a path 7050 (shown as a dotted line) that the simulated vehicle 7030 has traveled during a time period. In some instances, the path 7050 and the path 7060 may be identical, and in other instances, the path 7060 may deviate from the path 7050, as explained later herein (the deviation shown in FIG. 7 is exaggerated for illustrative purposes). The path 7050 may comprise a time series of location coordinates, or "waypoints," describing locations of a predetermined reference point on the simulated vehicle 7030 at sequential instants of time. For example, FIG. 7 depicts six waypoints, each shown as solid circles (i.e., as dots), with one waypoint 7052 specifically labeled as "t3: (x3, y3)" as explained below. Each such waypoint corresponds to a location where predetermined reference point 7054 of the simulated vehicle 7030 had been at a previous instant in time. For example, the reference point 7054 may a midpoint of a rear axle as shown by the hollow circle in FIG. 7. In some embodiments, the location coordinates of each waypoint may comprise a tuple of two-dimensional coordinates, for example (x,y), in a predefined plane, such as a plane of a ground surface, e.g., the X-Y (or X'-Y') plane shown in FIG. 8. In FIG. 7, the specifically labeled waypoint 7052 corresponds to location coordinates 7056 of (x3, y3) describing where the reference point 7054 had been at time instant t3.

A sequence of waypoints may be referred to as a "breadcrumb trail." A breadcrumb trail 7058 (shown as a solid bolded line) is depicted in FIG. 7, where each waypoint, e.g., waypoint 7052, is connected by a straight line to the previous and/or next waypoint(s). If the time interval between successive waypoints is reduced, the breadcrumb trail 7058 will more closely mimic the traveled path 7050. If the time interval between successive waypoints is excessively large, then interpolation between waypoints can be utilized to construct a breadcrumb trail that may more closely mimic the traveled path 7050 of the simulated vehicle 7030. Any suitable interpolation methods between waypoints may be utilized, e.g., spline interpolation.

When a tele-operator begins tele-operation of the simulated vehicle 7030, the breadcrumb trail 7058 starts with the simulated vehicle 7030 being in a home pose. In some implementations, the home pose corresponds to a pose (i.e., location and orientation) of the simulated vehicle 7030 being identical to a pose of the vehicle 7020. In essence, the simulated vehicle 7030 is superimposed (virtually) onto the vehicle 7020. Referring again to FIG. 6, when the tele-operator begins driving a simulated vehicle, e.g., simulated lead vehicle 7030, the simulated vehicle overlay 6012 may not be visible in the video streams 6030/6040/6050 because the simulated vehicle and the vehicle, e.g., vehicle 7020, have identical poses. However, once the tele-operator begins driving the simulated vehicle, e.g., generating driving input 4040 by pressing an accelerator pedal of a driving simulator cockpit and/or turning a steering wheel of the driving simulator cockpit, the simulated vehicle may advance ahead of the vehicle and therefore the simulated vehicle overlay 6012 may become visible in the video stream 6030/6040/ 6050. In some instances, the tele-operator who is driving the simulated vehicle may wish to start over, i.e., to reset the simulated vehicle to its home pose. For example, the tele-operator may have driven the simulated vehicle into an obstruction or a hazard. In such case, the tele-operator may cause a reset signal to be input into the system 4000, for example, into the kinematics component 4005. The reset signal may be comprised in the simulated driving input 4040. The reset signal may be effected by any suitable means, for example, by the tele-operator pressing a reset button. Upon reset, the current breadcrumb trail 7058 is effectively deleted.

A breadcrumb trail 7058 and/or a breadcrumb-reset signal may be transmitted to the vehicle 7020 (e.g., vehicle 2100 in FIG. 2) via a communication network (e.g., the electronic communication network 2300 of FIG. 2). For example, transmission of the breadcrumb trail 7058 may be initiated and or effected by the system 4000, which could be implemented by the controller apparatus 2410 of FIG. 2. For example, the breadcrumb trail 7058 may be received by a communication interface 1370 coupled to a communication unit 1320 as shown in the vehicle 1050 of FIG. 1. The waypoints (e.g., waypoint 7052) of the breadcrumb trail 7058 may be transmitted one at a time at periodic or aperiodic intervals, for example, coordinates (x1,y1) may be transmitted at or around time instant t1, coordinates (x2,y2) may be transmitted at or around time instant t2, and so on. Alternatively, waypoints may be transmitted multiple-at-a-time, for example, coordinates (x1,y1) and (x2,y2) may be transmitted at or around time t2. In either case, the time instants t1, t2, and so on, may be explicitly encoded in the transmitted data as timestamp values, or they may be implicitly encoded as a function of the arrival time of the transmitted data at the vehicle, e.g., determined or approximated by when the data is received at the communication unit 1320 of FIG. 1. For example, the communication unit 1320 may pass the multiple received waypoints to the processor 1330 along with their shared arrival time. The processor 1330 may record successive shared arrival times and compute, based on the arrival intervals and the number of waypoints received multiple-at-a-time, an approximate timestamp for each waypoint. For example, if the previous shared arrival time is recorded as tA, and waypoints w1, w2, and w3 arrive at the vehicle at time tB, then the processor 1330 may utilize simple linear interpolation to determine a timestamp for w1 as tA, a timestamp for w2 as tA+(1/3)(tB−tA) (i.e., one-third the duration from tA to tB), and a timestamp for w3 as tA+(2/3)(tB−tA) (i.e., two-thirds the duration from tA to tB). In some embodiments, nonlinear interpolation may be utilized. In some embodiments, the transmission delay (e.g., network latency) may be considered when determining timestamps for waypoints received multiple-at-a-time.

An autonomous vehicle that has requested tele-operation, and subsequently receives waypoints of a breadcrumb trail as a result of tele-operation activities such as those described above, may process the waypoints to determine a path to follow. The vehicle may be vehicle 1050 in FIG. 1, comprising a communication unit 1320 configured to receive the waypoints and a processor 1330 configured to process the waypoints. The processor 1330 may implement a path-planning algorithm that determines and selects an optimal path to follow based on the waypoints. The path-planning algorithm may determine a path to follow that judiciously or liberally coincides with the breadcrumb trail, e.g., breadcrumb trail 7058. An amount of deviation between the breadcrumb trail and the determined path to follow may be based on preconfigured or user-configurable tolerance parameters. Alternatively or additionally, a trajectory controller of the vehicle 1050 may optimize the path for the vehicle to follow. The vehicle, utilizing its own sensors and safety modules, may determine to deviate from the optimal path based on whether the vehicle determines the optimal path is safe to follow (e.g., clear of obstacles). Many embodiments of the safeguarded tele-operation disclosed herein are independent to specific implementations of the path-planning algorithm and/or path-optimization algorithm.

In some embodiments, the waypoints transmitted to an autonomous vehicle may comprise information in addition to spatial coordinates and an explicit or implicit timestamp value. Such additional information may be utilized by the autonomous vehicle to further optimize the path it follows and how it follows the path. For example, a waypoint may include additional information (e.g., parameters) about the simulated vehicle, such as its steering angle, speed, acceleration, yaw, yaw rate (i.e., time rate of change of yaw), and so on. Some or all of these parameters may be utilized by the autonomous vehicle to smooth out a received breadcrumb trail, to correct for over-steering or understeering of the simulated vehicle, or to account for other artifacts caused by the tele-operator or the tele-operation system (in some embodiments, these operations may be considered path optimization). Further, some or all of the aforementioned parameters may be utilized by the autonomous vehicle to determine one or more speeds that the autonomous vehicle should apply when following the path determined from the breadcrumb trail. These one or more speeds may be called a "speed profile." If the one or more speeds include a directional component, e.g., one or more velocities, then the profile may be called a "velocity profile." Similarly, some or all of the aforementioned parameters may be utilized by the autonomous vehicle to determine one or more accelerations that the autonomous vehicle should apply when following the path determined from the breadcrumb trail. These one or more accelerations may be called an "acceleration profile." In general, speed, velocity, and or acceleration profiles may be referred to individually or collectively as a "motion profile."

For example, if a tele-operator is required to drive the simulated vehicle over a speed bump or onto a curb to circumnavigate an obstruction, the tele-operator may drive the simulated vehicle at a higher speed when approaching the speed bump or curb, and at a slower speed when traversing the speed bump or curve. Without the autonomous vehicle receiving the speed data of the simulated vehicle included in the waypoints, the autonomous vehicle may traverse the speed bump or curb at an uncomfortably fast or dangerous speed. In some cases, however, the autonomous driving functions of the autonomous vehicle may identify the speed bump or curb in its path and the autonomous vehicle may modulate its speed appropriately even without receiving the speed data of the simulated vehicle included in the waypoints.

Referring again to FIG. 7, the vehicle 7020 determines and selects an optimal path 7060 to follow based on the received breadcrumb trail 7058. In some implementations, the vehicle 7020 must receive a threshold quantity of waypoints 7052 to constitute a breadcrumb trail 7058 necessary for determining and selecting an optimal path to follow and/or for causing the vehicle 7020 to begin following the path 7060. In some implementations, the threshold quantity necessary for determining and selecting an optimal path to follow may be different than the threshold quantity necessary for causing the vehicle to begin following the path 7060. In some embodiments, instead of a threshold quantity of waypoints 7052, a threshold distance between the simulated vehicle 7030 and the vehicle 7020 may be necessary for determining and selecting an optimal path to follow and/or for causing the vehicle 7020 to begin following the path 7060.

For simplicity of explanation, the process 10000 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 10010, a system can receive a video stream from a camera of a vehicle in a transportation network. For example, the system 4000 can receive the video stream 6030 from the camera 7010 of the vehicle 2100 in a transportation network 2200. The system can receive the video stream to enable tele-operation of the vehicle. For example, the system could be used by the tele-operators 3020/3030 to perform tele-operation of the vehicle 3040/3050/3060/3070.

At 10020, the system can receive an acceleration input and a steering input via a tele-operation apparatus operated by the tele-operator, such as a game controller, a joystick, a keyboard, a mouse, a steering wheel, an accelerator pedal, a brake pedal, or any combination thereof. the tele-operation apparatus may present a physical interface to the tele-operator or a virtual interface to the tele-operator, for example, as a GUI having a virtual accelerator pedal, a virtual brake pedal, and a virtual steering wheel.

At 10030, the system can determine a pose of a simulated vehicle relative to a home pose based on the acceleration input and the steering input. The pose comprises a location and an orientation of the simulated vehicle. In some embodiments, the home pose corresponds to a pose of the vehicle relative to at least one of the transportation network or the camera.

At 10040, the system can display an overlay of a representation of the simulated vehicle in the video stream at pixel coordinates based on the pose. When the simulated vehicle is in the home pose, the overlay may not be visible in the video stream. In some implementations, an acceleration component of the simulated driving input must exceed a predetermined threshold before the representation of the simulated vehicle is displayed in the video stream.

At 10050, the system can determine, from the pixel coordinates, spatial coordinates of the simulated vehicle in the transportation network, wherein the spatial coordinates are relative to at least one of the transportation network or the camera. For example, the kinematics component 4005 of the system 4000 can utilize trigonometric and/or geometric calculations to determine three-dimensional spatial coordinates and orientation angles of the simulated vehicle to generate a kinematics output 4045 that includes a location and orientation of the simulated vehicle.

At 10060, the system can transmit the spatial coordinates to the vehicle to cause the vehicle to follow a path based on the spatial coordinates. For example, the vehicle may be vehicle 1050 in FIG. 1, comprising a communication unit 1320 configured to receive the spatial coordinates and a processor 1330 configured to process the spatial coordinates. The processor 1330 may implement a path-planning algorithm that determines and selects an optimal path to follow based on the spatial coordinates. The path-planning algorithm may determine a path to follow that judiciously or liberally coincides with the spatial coordinates. An amount of deviation between the spatial coordinates and the determined path to follow may be based on preconfigured or user-configurable tolerance parameters. Alternatively or additionally, a trajectory controller of the vehicle 1050 may optimize the path for the vehicle to follow. The vehicle, utilizing its own sensors and safety modules, may determine to deviate from the optimal path based on whether the vehicle determines the optimal path is safe to follow (e.g., clear of obstacles).

The process 10000 may include additional steps and aspects not shown in FIG. 10. For example, the system can determine a projected path of the simulated vehicle based on the pose of the simulated vehicle and at least one of the acceleration input and the steering input, and display an overlay of a representation of the projected path in the video stream. The projected path may be determined using spatial coordinates relative to at least one of the transportation network or the camera. For example, the pathfinding component 4010 of the system 4000 can take the simulated driving input 4040, such as the steering angle and/or the acceleration for the simulated vehicle, and the kinematics output 4045, and utilize the Ackermann model to determine a radius of a curve of the projected path of the simulated vehicle. The pathfinding component 4010 can then utilize trigonometric and/or geometric calculations to determine three-dimensional spatial coordinates of the projected path of the simulated vehicle to generate a path output 4050.

The system can transmit information, e.g., parameters, to the vehicle in addition to the spatial coordinates, such as information representing at least one of the steering input, the acceleration input, the speed of the simulated vehicle, and some or all components of the pose of the simulated vehicle, e.g., a yaw component. For example, the kinematics component 4005 of the system 4000 can determine the speed, acceleration, and pose of the simulated vehicle via the pose input 4035. Some or all of these parameters may be utilized by the autonomous vehicle to smooth out a received sequence of spatial coordinates, to correct for over-steering or understeering of the simulated vehicle, or to account for other artifacts caused by the tele-operator or the tele-operation system (in some embodiments, these operations may be considered path optimization). Further, some or all of the aforementioned parameters may be utilized by the autonomous vehicle to determine a speed profile, a velocity profile, an/or an acceleration profile (e.g., collectively, a motion profile) that the autonomous vehicle should apply when following the path determined from the spatial coordinates.

As used herein, the terminology "example," "embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify." or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. A method, comprising:
receiving a video stream from a camera of a vehicle in a transportation network;
receiving an acceleration input and a steering input;
determining a pose of a simulated vehicle relative to a home pose based on the acceleration input and the steering input;
displaying, by a processor, an overlay of a representation of the simulated vehicle in the video stream at pixel coordinates based on the pose;
determining, by the processor without operator input, from the pixel coordinates, spatial coordinates of the simulated vehicle in the transportation network, wherein the spatial coordinates are relative to at least one of the transportation network or the camera; and
transmitting the spatial coordinates to the vehicle to cause the vehicle to follow a path based on the spatial coordinates.

2. The method of claim 1, wherein:
the home pose corresponds to a pose of the vehicle relative to at least one of the transportation network or the camera.

3. The method of claim 1, further comprising:
resetting the pose of the simulated vehicle to the home pose in response to receiving a reset input.

4. The method of claim 1, further comprising:
determining a projected path of the simulated vehicle based on the pose of the simulated vehicle and at least one of the acceleration input and the steering input; and
displaying, by the processor, an overlay of a representation of the projected path in the video stream.

5. The method of claim 1, further comprising:
determining a speed of the simulated vehicle; and
transmitting information to the vehicle representing at least one of:
the steering input,
the acceleration input,
the speed, and
a yaw component of the pose.

6. The method of claim 1, wherein:
the representation of the simulated vehicle is displayed in the video stream after the acceleration input exceeds a predetermined threshold.

7. The method of claim 1, wherein:
the representation of the simulated vehicle comprises representations of a set of wheels, a chassis, a front bumper, and a read bumper, each modeled after the vehicle.

8. An apparatus, comprising:
a memory; and
a processor configured to execute instructions stored in the memory to:
receive a video stream from a camera of a vehicle in a transportation network;
receive an acceleration input and a steering input;
determine a pose of a simulated vehicle relative to a home pose based on the acceleration input and the steering input;
display, by the processor, an overlay of a representation of the simulated vehicle in the video stream at pixel coordinates based on the pose;
determine, by the processor without operator input, from the pixel coordinates, spatial coordinates of the simulated vehicle in the transportation network, wherein the spatial coordinates are relative to at least one of the transportation network or the camera; and
transmit the spatial coordinates to the vehicle to cause the vehicle to follow a path based on the spatial coordinates.

9. The apparatus of claim 8, wherein:
the home pose corresponds to a pose of the vehicle relative to at least one of the transportation network or the camera.

10. The apparatus of claim 8, wherein the instructions include instructions to:
reset the pose of the simulated vehicle to the home pose in response to receiving a reset input.

11. The apparatus of claim 8, wherein the instructions include instructions to:
determine a projected path of the simulated vehicle based on the pose of the simulated vehicle and at least one of the acceleration input and the steering input; and
display, by the processor, an overlay of a representation of the projected path in the video stream.

12. The apparatus of claim 8, wherein the instructions include instructions to:
determine a speed of the simulated vehicle; and
transmit information to the vehicle representing at least one of:

the steering input, the acceleration input, the speed, and a yaw component of the pose.

13. The apparatus of claim 8, wherein:

the representation of the simulated vehicle is displayed in the video stream after the acceleration input exceeds a predetermined threshold.

14. The apparatus of claim 8, wherein:

the representation of the simulated vehicle comprises representations of a set of wheels, a chassis, a front bumper, and a read bumper, each modeled after the vehicle.

15. A non-transitory computer-readable medium storing instructions operable to cause one or more processors to perform operations comprising:

receiving a video stream from a camera of a vehicle in a transportation network;

receiving an acceleration input and a steering input;

determining a pose of a simulated vehicle relative to a home pose based on the acceleration input and the steering input;

displaying, by the one or more processors, an overlay of a representation of the simulated vehicle in the video stream at pixel coordinates based on the pose;

determining, by the processor without operator input, from the pixel coordinates, spatial coordinates of the simulated vehicle in the transportation network, wherein the spatial coordinates are relative to at least one of the transportation network or the camera; and transmitting the spatial coordinates to the vehicle to cause the vehicle to follow a path based on the spatial coordinates.

16. The medium of claim 15, wherein:

the home pose corresponds to a pose of the vehicle relative to at least one of the transportation network or the camera.

17. The medium of claim 15, the operations further comprising:

resetting the pose of the simulated vehicle to the home pose in response to receiving a reset input.

18. The medium of claim 15, the operations further comprising:

determining a projected path of the simulated vehicle based on the pose of the simulated vehicle and at least one of the acceleration input and the steering input; and displaying, by the one or more processors, an overlay of a representation of the projected path in the video stream.

19. The medium of claim 15, the operations further comprising:

determining a speed of the simulated vehicle; and transmitting information to the vehicle representing at least one of:

the steering input, the acceleration input, the speed, and a yaw component of the pose.

20. The medium of claim 15, wherein:

the representation of the simulated vehicle is displayed in the video stream after the acceleration input exceeds a predetermined threshold.

21. The medium of claim 15, wherein:

the representation of the simulated vehicle comprises representations of a set of wheels, a chassis, a front bumper, and a read bumper, each modeled after the vehicle.

* * * * *